United States Patent [19]

Haitko

[11] Patent Number: 5,391,305

[45] Date of Patent: Feb. 21, 1995

[54] DEHALOGENATION OF HALOGENATED HYDROCARBONS IN AQUEOUS COMPOSITIONS

[75] Inventor: Deborah A. Haitko, Schenectady, N.Y.

[73] Assignee: General Electric Company, Schenectady, N.Y.

[21] Appl. No.: 260,432

[22] Filed: Jun. 15, 1994

Related U.S. Application Data

[62] Division of Ser. No. 223,401, Apr. 4, 1994.

[51] Int. Cl.$^6$ ................................................ C02F 1/70
[52] U.S. Cl. ..................................... 210/757; 210/908; 210/747; 588/206
[58] Field of Search .............. 210/757, 908, 909, 747; 588/206

[56] References Cited

U.S. PATENT DOCUMENTS

| | | | |
|---|---|---|---|
| 4,284,516 | 8/1981 | Parker et al. | 210/757 |
| 4,416,767 | 11/1983 | Jordan | 208/262 |
| 4,592,844 | 6/1986 | Layman et al. | 210/757 |
| 4,618,686 | 10/1986 | Boyer | 210/757 |
| 4,755,296 | 7/1988 | Ying et al. | 210/909 |
| 4,758,346 | 7/1988 | Johnson | 210/638 |
| 5,019,175 | 5/1991 | Rogers et al. | 210/909 |
| 5,051,030 | 9/1991 | Saha et al. | 405/128 |
| 5,093,011 | 3/1992 | Friedman et al. | 210/757 |
| 5,096,600 | 3/1992 | Hoch | 210/751 |
| 5,273,657 | 12/1993 | Nakashima et al. | 210/640 |

FOREIGN PATENT DOCUMENTS

| | | |
|---|---|---|
| 0454642A1 | 10/1991 | European Pat. Off. . |
| 3912820C2 | 10/1990 | Germany . |
| 53-55475 | 5/1978 | Japan . |
| 2238533A | 6/1991 | United Kingdom . |
| WO92/07797 | 5/1992 | WIPO . |

OTHER PUBLICATIONS

K. H. Sweeny, Ph. D., "Reductive Degradation: Versatile, Low Cost", *Water & Sewage Works*, Jan. 1979, pp. 40–42.

*Primary Examiner*—Neil McCarthy
*Attorney, Agent, or Firm*—James Magee, Jr.

[57] ABSTRACT

A process for dehalogenating hydrocarbon compounds that contaminate aqueous compositions is disclosed. The process admixes the contaminated aqueous composition with ferrous oxide. The use of citric acid in the reaction is optional. The reaction can be performed in situ and ex situ on contaminated groundwaters, ponds and streams.

9 Claims, No Drawings

DEHALOGENATION OF HALOGENATED HYDROCARBONS IN AQUEOUS COMPOSITIONS

This application is a division of application Ser. No. 08/223,401, filed Apr. 4, 1994.

FIELD OF THE INVENTION

The present invention relates to a method for the dehalogenation of halogenated hydrocarbons in aqueous compositions by ferrous oxide. More specifically, it relates to dechlorination of chlorinated hydrocarbon compounds in aqueous compositions by ferrous oxide.

BACKGROUND OF THE INVENTION

Over the years, halogenated hydrocarbons, including chlorinated hydrocarbons such as trichloroethylene, have been accumulating in the environment, particularly in groundwaters. As a result, pollution of water by halogenated hydrocarbons has become an important environmental problem. Contaminated groundwaters represent a large portion of environmental remedial action plans throughout the world.

Dehalogenation of halogenated hydrocarbons by elemental iron to generate innocuous products is known. For instance, dechlorination of trichloroethylene by iron produces reaction products such as ethylene, ethane, and chloride ion. The use of iron in the reaction affords little environmental threat. Thus, it is desirable to be able to efficiently dechlorinate groundwater contaminates using iron.

Recently, Gillham and O'Hannesin disclosed in U.S. Pat. No. 5,266,213, a method for cleaning halogenated contaminants from groundwater. The process involves feeding contaminated groundwater through a trench containing a metal such as iron, under strict exclusion of oxygen, and over a lengthy period of time. Disadvantages of this system are that large amounts of iron are needed for completion of the reactions, as well as, substantial periods of reaction time are required.

Commonly owned, copending application, titled "Enhanced Remediation of Aqueous Compositions Contaminated with Halogenated Hydrocarbons," discloses a method which reductively reacts chlorinated hydrocarbons with metallic iron in the presence of citric acid to generate innocuous byproducts. Also disclosed in commonly owned, copending application titled "Dechlorination of Chlorinated Hydrocarbons by Soluble Iron Citrate," is a method utilizing a preformed ferrous citrate complex to generate chloride ion and rapid degradation of chlorinated hydrocarbons.

It has now been discovered that commercially available iron(II) oxide can dehalogenate hydrocarbons, such as trichloroethylene, trichloroethane, cis and 1,1 dichloroethylene, and brominated aliphatics, in solution at a rapid rate. The rate can be further accelerated by adding at least about 0.5 to 1 percent citric acid based on the weight of iron(II) oxide used.

SUMMARY OF THE INVENTION

This invention provides a method for remediation of aqueous compositions contaminated with halogenated hydrocarbons which comprises admixing said aqueous compositions with an effective amount of ferrous oxide thereby generating innocuous byproducts. Herein, ferrous oxide and iron(II) oxide refer to the same substituent. The reaction may be conducted in the presence of at least about 0.5 to 1 per cent citric acid based on the weight of ferrous oxide added to the contaminated aqueous composition. Also, if the reaction solution is buffered between about 5.0 to 7.6, the reaction rate is further enhanced.

An effective amount of ferrous oxide, as used in this invention, means an amount which is sufficient to reduce the halogen-carbon bonds of the halogenated hydrocarbon contaminant compounds so that non-toxic end products are produced.

Addition of citric acid to the reaction mixture is optional. By adding citric acid to the reaction solution, the rate of dehalogenation is enhanced. The amount of citric acid added is at least about 0.5 to 1.0 per cent by weight of the amount of ferrous oxide added to the solution. For instance, in a reaction with two grams of ferrous oxide, about 0.01 to 0.02 grams of citric acid are added.

The invention can be practiced in different settings. For instance, the method of this invention can be practiced in situ without the removal of the contaminated water from the ground, pond, or stream. Contaminants can be degraded in place because the reaction products are environmentally acceptable and need not be removed.

Additionally, this invention can be practiced ex situ by various methods, including but not limited to, batch processing or passing the contaminated solution through a column. In batch processing the contaminated aqueous composition is treated in a separate container by admixing the reagents with the contaminated solution. In column treatment, ferrous oxide is packed as a reactive medium in the column while the contaminated solution is passed through the column. The addition of citric acid to the contaminated solution, before feeding it into the column, is optional depending upon rate considerations.

An object of this invention is to provide a method for dehalogenating hydrocarbons in aqueous compositions using ferrous oxide to produce innocuous byproducts.

It is a further object of this invention to detoxify waters contaminated with chlorinated hydrocarbons A specific object of this invention is to remove trichloroethylene from contaminated groundwaters without producing toxic end products.

DESCRIPTION OF THE INVENTION

A system has been discovered to treat aqueous compositions contaminated with halogenated hydrocarbons that degrades the hydrocarbons to non-toxic products utilizing ferrous oxide with or without citric acid being present.

In the preferred practice of this invention, an admixture of ferrous oxide and citric acid is admixed with halogenated hydrocarbon aqueous compositions under buffered conditions. Buffered conditions refers to the utilization of a compatible commercial buffer, such as sodium dibasic phosphate and potassium monobasic phosphate or calcium carbonate and carbon dioxide, in an amount so as to maintain the pH of the solution between about 5.0 to 7.6. A buffered pH solution between about 5.4 to 6.4 is optimum. However, the reaction will proceed without a buffering agent in the pH range of about 3.0 to 9.0.

The dehalogenation reaction is normally carried out under ambient temperature and pressure. Temperatures as low as about 17° C. can be utilized, as well as temperatures above 25° C. When temperatures above 25° C. are employed, the result is a faster rate of reaction.

It has been demonstrated that about 2.57 grams of ferrous oxide can be employed to dechlorinate twenty-five parts per million trichloroethylene in 100 mL of aqueous solution. The reduction of trichloroethylene by ferrous oxide in the presence of one per cent citric acid under buffered conditions, pH 5.8, is shown in Table 1.

TABLE 1

Trichloroethylene (25 ppm) Destruction with Ferrous Oxide and Citric Acid Under Buffered Conditions.

| TIME (hour) | Parts per Million Trichloroethylene |
|---|---|
| 0 | 23.89 ppm |
| 0.25 | 15.25 ppm |
| 0.50 | 11.14 ppm |
| 0.75 | 11.91 ppm |
| 1.0 | 7.61 ppm |
| 1.5 | 6.30 ppm |
| 2.0 | 5.65 ppm |
| 3.0 | 2.23 ppm |
| 4.0 | 2.39 ppm |
| 5.0 | 0.32 ppm |
| 6.0 | 0.42 ppm |
| 7.0 | 0.18 ppm |

A comparison of the reaction rate of two grams of metallic iron versus reaction with 2.57 grams ferrous oxide, both under buffered conditions and containing one per cent citric acid is shown in Table 2. In each reaction twenty-five parts per million (ppm) of trichloroethylene (TCE) were dechlorinated.

TABLE 2

Comparison of Metallic Iron and Ferrous Oxide.

| Time (hr) | ppm TCE with FeO | Time (hr) | ppm TCE with Fe |
|---|---|---|---|
| 0 | 23.89 ppm | 0 | 20.22 ppm |
| 0.25 | 15.25 ppm | 0.25 | 9.13 ppm |
| 0.5 | 11.14 ppm | 0.5 | 3.59 ppm |
| 0.75 | 11.91 ppm | 0.75 | 1.14 ppm |
| 1.0 | 7.62 ppm | 1.0 | 0.30 ppm |
| 1.5 | 6.30 ppm | 1.5 | 0.68 ppm |
| 2.0 | 5.65 ppm | 2.0 | 0.0 |
| 3.0 | 2.23 ppm | | |
| 4.0 | 2.39 ppm | | |
| 5.0 | 0.32 ppm | | |
| 6.0 | 0.42 ppm | | |
| 7.0 | 0.18 ppm | | |

The production of chloride ion coupled with trichloroethylene loss in a reaction with ferrous oxide and one per cent citric acid under buffered conditions at pH 5.8 is given in Table 3.

TABLE 3

Dechlorination of Trichloroethylene by Ferrous Oxide and 1% Citric Acid.

| Time (hr) | millimoles Cl⁻ produced | millimoles TCE consumed |
|---|---|---|
| 0 | 0 | 0 |
| 0.25 | .0087 | .0062 |
| 0.5 | .0099 | .0093 |
| 0.75 | .0096 | .0087 |
| 1.0 | .0117 | .0120 |
| 1.5 | .0127 | .0130 |
| 2.0 | .0124 | .0135 |
| 3.0 | .0141 | .0161 |
| 4.0 | .0142 | .0160 |
| 5.0 | .0143 | .0176 |
| 6.0 | .0143 | .0175 |
| 7.0 | .0157 | .0177 |

TABLE 3-continued

Dechlorination of Trichloroethylene by Ferrous Oxide and 1% Citric Acid.

| Time (hr) | millimoles Cl⁻ produced | millimoles TCE consumed |
|---|---|---|
| 8.0 | .0150 | .0166 |

The following example serves to demonstrate further the method of this invention.

EXAMPLE I

General Procedures: Iron (II) Oxide was used as received. Citric acid and trichloroethylene were used as purchased. Gas chromatography conditions include use of an electron capture detector operating at 300° C. and injector temperature of 200° C. A capillary JW Scientific DB-1 column, 30 meters, was-used with a temperature gradient program set at an initial oven temperature of 50° C. and held for 2 minutes after which time the temperature was ramped to 120° C. at a rate of 20° C. per minute and held for 5 minutes. Reactions were set in 100 mL hypovials and loaded with iron, buffers, or citric acid prior to the addition of a 20–25 part per million trichloroethylene solution.

Dechlorination Experiment: In a typical reaction, 2.57 grams of iron (II) oxide (0.036 moles) are added to a 100 mL hypovial. Citric acid in the amount of 0.026 grams (0.01 millimoles) is added to the same vial with 1.0 gram of commercially available sodium phosphate monobasic and potassium phosphate dibasic to control the pH at 5.8 for 100 mL of aqueous solution. 100 mL of a 25 part per million trichloroethylene aqueous solution are added to the vial and the vial immediately sealed with teflon coated septa and aluminum crimp caps. The hypovials containing all reagents are shaken through use of an Orbital Shaker set at 200 revolutions per minute. To ensure integrity of the trichloroethylene aqueous solutions, sampling is performed using a 5 mL gas tight syringe and the sample withdrawn and immersed in an equivolume amount of high purity hexane to extract trichloroethylene from the aqueous phase prior to GC - Electron Capture detection analysis. Complete loss of trichloroethylene from the aqueous solution is seen within eight hours coupled with chloride ion production. Chloride ion generated accounts for 88–90% of the chloride ion generated upon dechlorination.

What is claimed is:

1. A method for dehalogenation of aqueous compositions contaminated with halogenated hydrocarbon compounds without the formation of environmentally harmful byproducts consisting essentially of admixing the aqueous composition with an amount of ferrous oxide effective to dehalogenate the halogenated hydrocarbons at a pH between about 3.0 and 9.0 and at a temperature of at least about 17° C.

2. A method according to claim 1 wherein the halogenated hydrocarbon compounds are chlorinated hydrocarbons.

3. A method according to claim 2 wherein the chlorinated hydrocarbons are polychlorinated hydrocarbons.

4. A method according to claim 3 wherein the polychlorinated hydrocarbon is trichloroethylene.

5. A method according to claim 1 wherein the reaction is buffered and the pH is between about 5.0 and 7.6.

6. A method according to claim 5 wherein the pH is between about 5.4 and 6.4.

7. A method according to claim 5 wherein the buffering agent is selected from the group consisting of sodium dibasic phosphate and potassium monobasic phosphate, and calcium carbonate and carbon dioxide.

8. A method according to claim 1 wherein the contaminated aqueous composition is groundwater.

9. A method according to claim 8 wherein the reaction takes place in situ.

* * * * *